J. G. ANTHONY.
INDICATOR.
APPLICATION FILED JULY 18, 1913.
1,151,152.
Patented Aug. 24, 1915.
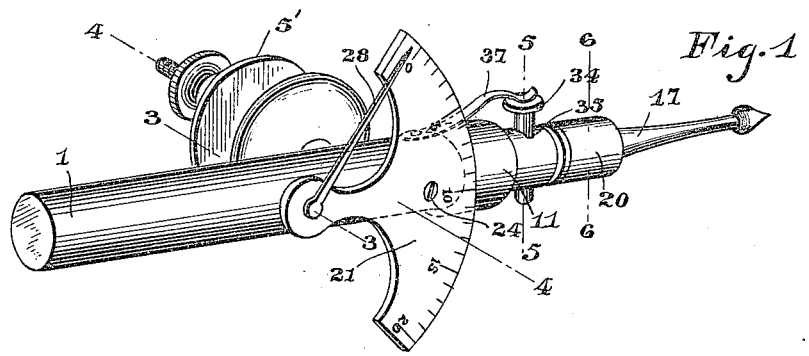
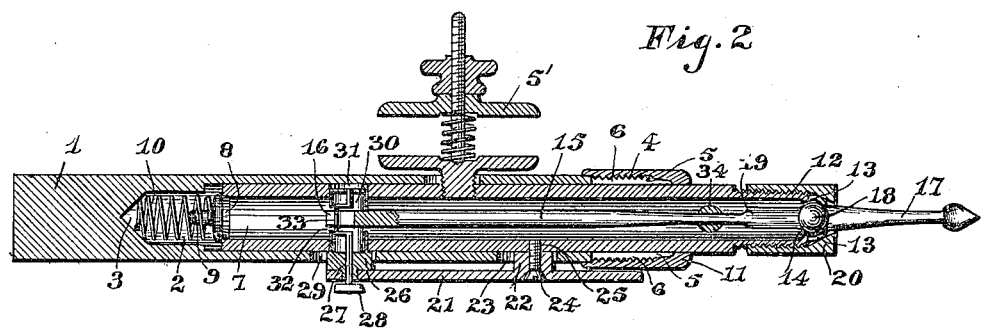
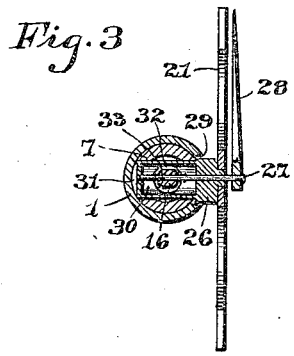
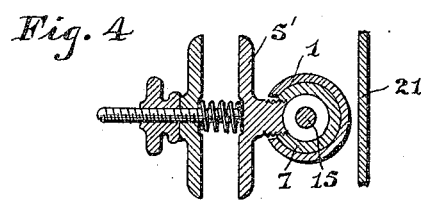
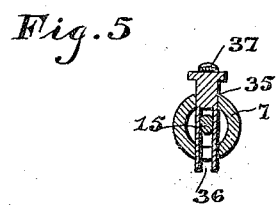
Witnesses
Edward I. Disney
D. W. Gould.
Inventor
Joseph G. Anthony
By Victor J. Evans
Attorney

UNITED STATES PATENT OFFICE.

JOSEPH G. ANTHONY, OF DETROIT, MICHIGAN.

INDICATOR.

1,151,152.  Specification of Letters Patent.  Patented Aug. 24, 1915.

Application filed July 18, 1913. Serial No. 779,854.

*To all whom it may concern:*

Be it known that I, JOSEPH G. ANTHONY, a citizen of the United States, residing at Detroit, in the county of Wayne and State of Michigan, have invented new and useful Improvements in Indicators, of which the following is a specification.

This invention relates to an indicator designed particularly for testing purposes, comprehending a structure which will accurately gage inside or outside surface work, as well as to indicate the center mark with a spindle of the milling machine.

The main object of the present invention is the provision of an indicator which may be readily attached to a spindle or nipple of any surface gage or clamped onto the spindle and placed in a V block of the tool post and used in connection therewith to show the slightest variation in the work handle in the lathe.

The invention in its preferred form of details will be described in the following specification, reference being had to the accompanying drawing in which:

Figure 1 is a perspective view of the improved indicator. Fig. 2 is a longitudinal central section of the same. Fig. 3 is a section on line 3—3 of Fig. 1. Fig. 4 is a section on line 4—4 of Fig. 1. Fig. 5 is a section on line 5—5 of Fig. 1. Fig. 6 is a section on line 6—6 of Fig. 1.

The improved indicator comprises what will be termed the main shank member 1, hollow for the greater portion of its length the cored out portion terminating adjacent one end in a reduced socket 2 having inclined end walls 3. The cored out portion of the shank extends through the opposite end, and said hollow end is exteriorly threaded at 4 and longitudinally slotted at 5 to provide more or less flexible gripping sections 6. The shank 1 which will be hereinafter termed the outer member is designed to slidably receive an inner member or sleeve 7. The inner member which is cored throughout its length has a removable plug 8 fitting the rear end thereof and having an extension 9 to receive and support a coil spring 10, which when the inner member is within the outer member bears against the bottom 3 of the socket 2 to provide a resilient seat. The inner member is of such length that when in position in the outer member it projects beyond the end thereof, a clamp nut 11 being designed to encircle the inner member and engage the threaded portion 4 of the outer member to clamp the inner member in place. The forward terminal of the inner member is exteriorly threaded at 12 and longitudinally slotted at 13 to provide clamping jaws, the extreme forward portions of these jaws being reduced in thickness and formed together to provide a spherical socket member for a purpose which will later appear. The inner member 7 is designed to receive what I term a center pin 15 comprising a suitable length of material having a slotted or bifurcated rear end 16 and an outer forward end 17.

Adjacent the forward end the center pin is provided with a spherical enlargement 18, and in rear of this enlargement the pin is reduced in diameter to provide a shoulder 19. The center pin is fitted within the inner member 7 so that the spherical enlargement 18 of said center pin seats within the spherical socket 14 of the inner member, a clamping nut 20 being arranged to coöperate with the threaded portion 12 of the inner member, and serving to maintain this relative position of the parts for pivotal movement.

A gage plate 21 is provided, preferably of the shape shown in Fig. 1, designed to be secured to the inner member, said plate being provided adjacent its forward or graduated edge with a nipple 22 designed to pass loosely through an elongated opening 23 in the outer member and bear upon the inner member, a screw 24 passing through the nipple into the threaded opening 25 in the wall of the inner member. The rear or reduced end of the plate is provided with a bearing extension 26 in which is rotatably mounted the shaft 27 of the indicating pointer 28, said pointer overlying the plate and coöperating with the gage marks thereon. The bearing 26 is adapted to pass through the elongated opening 29 in the outer member and has a reduced extension 30 passing more or less snugly through an opening 31 formed in the inner member, said extension 30 being of such length that an opening 32 formed therein will register with the bore of the inner member when the parts are arranged as described. The shaft 27 of the pointer 28 is formed with a crank portion 33 which operates within the opening 32 of the bearing nipple, said crank portion 33 being engaged in the bifurcated end 16 of the center pin.

In use for determining center mark on a piece of work to be operated upon, the outer member 1 of the device is fitted in the chuck. The piece of work is then clamped between the head and tail stock of a lathe (not shown) the former being provided with the usual cone pulleys over which rides a belt for rotating the head stock. The inner member 7 carrying the center pin 15 is as above stated slidably fitted within the outer member 1, thus permitting the pin to move longitudinally against the resistance of the spring 10 when setting the indicator with relation to a piece of work, thereby avoiding blunting of the point of the pin when moved into engagement with the work. After being associated with the work, the clamp nut 11 is tightened so as to relatively fix the outer and inner members. The work is then slowly rotated against the pointed end 17 of the center pin by operating the belt of the lathe by hand thus imparting a circulatory movement to the pointed end 17 of the center pin, until the latter locates the true center of the work which will be indicated by the pointer 28 as will be readily understood. Thereafter the indicating device is removed from the chuck, it being understood of course that the support for the latter is locked in its true adjusted position prior to the removal of the device, so that when the tool is inserted in the chuck it will be sustained in true central adjustment with relation to the piece of work.

When the device is used for surface or inside testing the locking and guiding member 34 is employed for the center pin 15. This member comprises a headed shank designed to be passed through an opening 35 and that portion of the inner member immediately in advance of the outer member, that end of the shank within the inner member being bifurcated at 36 to fit over the center pin to prevent rotation of the latter in its movement in the gaging operation. The member 34 is snugly held in position by the spring 37 bearing upon the head of the member and secured at its opposite end to the outer member as shown. With the locking and guiding member in operative position a vertical oscillatory movement essential in surface and inside testing is imparted to the center pin 15, it of course being understood that the locking member 34 is only employed when the device is used for outside surface or inside testing. For most outside surface and inside testing the clamp 5' is used, which clamp readily holds the indicator to any rod, tool post, or other part of the lathe. It is to be also understood that the clamp 5' is removed when the device is used in any capacity, other than outside surface or inside testing.

When the device is used for surface or inside testing and the guiding member 34 employed, the pointer 28 is normally held at zero by means of this member 34 pressing upon the center pin 15, the pressure being obtained from the flat spring 37 bearing against the member 34 as clearly shown in Fig. 1 of the drawing. However when the device is used for determining center mark on a piece of work to be operated upon, the member 34 is removed. When the device is used in this capacity the pointer 28 is not intended to be normally held at zero but would more likely rest in or about the mark 10 on the graduated plate 21 allowing a range both ways for the untruth of chuck jaws which hold member 1 when in the machine. In this instance the member 1 is first placed in the chuck of the machine, the usual chuck jaws gripping the shank member 1. Then start the machine running, and while the indicator is turning hold a steady fixed part touching point of center pin 15 until such runs true with your eye. This work may bring pointer near mark 10 on graduated plate, but this of course would depend upon the trueness of the chuck jaws that hold the shank 1 of the indicator. After this is done you have the center approximately with your eye, then adjust the machine so as to bring work that is to be indicated close to your pointer, now already set, engage pointer with mark to be indicated. Then turn spindle of machine by hand, and if said mark is to be shifted so as to bring same centrally said tool will indicate the same.

It is believed that from the foregoing description the nature and advantages of the invention will be readily understood without requiring a more extended explanation and therefore the same has been omitted. However I desire to have it understood that various changes in the construction and arrangement of parts may be resorted to when desired as fall within the scope of the appended claims.

What I claim is:—

1. An indicator gage comprising an outer member, an inner member slidably mounted therein, means for preventing relative movement of said members in operative position, a spring arranged within the outer member and bearing against the adjacent end of said inner member, a center gage pin mounted in the inner member, a gage plate carried by the inner member, and a pointer for said plate operatively connected to the center pin.

2. An indicator gage comprising inner and outer tubular members, a gage plate carried by the inner member and arranged exteriorly of the outer member, a shaft having a crank portion arranged within said inner member, a pointer mounted on said plate and connected with said shaft, a center pin mounted in the inner member, and said pin having a bifurcated end to engage the crank portion of the shaft.

3. An indicator gage comprising an outer tubular member, an inner tubular member, a gage plate carried by the inner member and arranged exteriorly of the outer member, a shaft having a crank portion disposed within said inner member, a pointer mounted on said plate and connected with said shaft, a center gage pin mounted in the inner member and having bifurcated end to engage the crank portion of the shaft, said inner member having a spherical socket terminal, said center pin being formed with a spherical enlargement to seat in said socket.

4. An indicator comprising an outer tubular member, an inner tubular member, a gage plate carried by the inner member and disposed exteriorly of the outer member, a shaft having a crank portion arranged within said outer member, a pointer mounted on said plate and connected with said shaft, a center gage pin arranged in the inner member and having a bifurcated end to engage the crank portion arranged within said inner member, said center pin being formed with a shoulder and a guiding member passing loosely through the inner member and straddling the center pin in the rear of the shoulder.

5. An indicator gage comprising an outer tubular member, an inner tubular member, a gage plate carried by the inner member and disposed exteriorly of the outer member, a shaft having a crank portion arranged within the inner member, a pointer mounted on said plate and connected with said shaft, a center gage pin mounted in said inner member and having a bifurcated end to engage the crank portion of the shaft, said center pin being formed with a shoulder, a guide member passing loosely through the inner member and straddling the pin in the rear of the shoulder, and a spring bearing on said guiding member to permit yielding movement thereof.

6. An indicator gage comprising an outer tubular member, an inner tubular member, a gage plate carried by the inner member and disposed exteriorly of the outer member, a shaft having a crank portion arranged within the inner member, a pointer mounted on said plate and connected with said shaft, a center gage pin arranged in the inner member and having a bifurcated end to engage the crank portion of the shaft, and means for preventing endwise separation of the inner and outer members.

7. An indicator gage comprising an outer tubular member, an inner tubular member, a gage plate carried by the inner member and disposed exteriorly of the outer member, a shaft having a crank portion arranged in said inner member, a pointer mounted on said plate and connected with said shaft, a center gage pin mounted in the inner member and having a bifurcated end to engage the crank portion of the shaft, and means for preventing endwise separation of the center pin and inner member.

8. An indicator gage comprising an outer tubular member, an inner tubular member, a gage plate carried by the inner member, and disposed exteriorly of the outer member, a shaft having a crank portion arranged in the inner member, a pointer mounted on said plate and connected with said shaft, a center gage pin disposed in the inner member and having a bifurcated end to engage the crank portion of the shaft, said pin being formed with a shoulder, a guiding member passing loosely through the inner member and straddling the center pin in the rear of the shoulder, a spring bearing upon the guiding member to permit yielding movement thereof, and a clamping element removably secured to the inner member and projecting beyond the outer member.

In testimony whereof I affix my signature in presence of two witnesses.

JOSEPH G. ANTHONY.

Witnesses:
GRACE F. HIND,
EDWARD ANTHONY.

Copies of this patent may be obtained for five cents each, by addressing the "Commissioner of Patents, Washington, D. C."